Patented Sept. 3, 1940

2,213,321

UNITED STATES PATENT OFFICE 2,213,321

CRUDE RUBBER AND METHOD OF MAKING SAME

John McGavack, Leonia, and Chester E. Linscott, Ridgewood, N. J., assignors to United States Rubber Company, New York, N. Y., a corporation of New Jersey No Drawing. Application December 29, 1938, Serial No. 248,210

5 Claims. (Cl. 260—821)

This invention relates to a process for treating rubber latex, and to the product, and is more particularly directed to the preparation of a new type of crude rubber.

According to the present invention, Hevea latex is treated with a small amount of formaldehyde and, preferably after being allowed to stand around twelve hours or more, the rubber particles in the latex are aggregated and the aggregates are washed sufficiently so that the natural ash constituents of the recovered rubber amount to less than 0.12%. At the same time, however, the washing is made to take place in such a manner that the nitrogen content of the dried rubber product is at least .37%.

One advantage of this new type of rubber is that a large proportion of the protein substances and natural antioxidants is retained in the rubber, while at the same time, a large proportion of the water-soluble substances is eliminated with the consequent advantage of low water absorption of the rubber and articles made from it. Another advantage is that the rubber of the present invention has a decidedly lower viscosity than the usual pale crepe or smoked sheet rubbers, resulting in lower power consumption in breaking down the rubber. A further advantage of this crude rubber is an increased abrasion resistance of wear resistant compounds, for example, tire tread stocks. Again the process is such that bulking of the latex is possible due to the addition of the formaldehyde which preserves the latex from putrefaction, so that a more uniform crude rubber may be obtained than in the present methods of recovering rubber from latex in which the individual lots of latex are coagulated as soon after tapping as possible in order to prevent putrefaction, since preservatives are usually not added to the latex before coagulating it into crude rubber. This bulking process is of importance since it is characteristic of Hevea latex that the per cent nitrogen is practically constant on the latex as it comes from the tree and is independent of the total solids content. For this reason, we prefer to maintain the natural concentration of the latex started with between 34% and 44% solids, so that the nitrogen variation in the finished product is small. A further advantage is the exceptional high yield of first grade rubber obtained by this process, which is accomplished without the use of the usual heavy milling equipment. Another advantage is freedom from odors characteristic of ordinary crude rubbers, and from the dark color characteristic of smoked sheets. Another advantage of this rubber is the small amount of free acid present.

Latex as it is tapped has a pH of about 7, and on addition of about .4% to 3% of formaldehyde, based on the latex, the pH on standing drops to within the range of 5 to 6. It is known that the rubber particles of latex thus treated with formaldehyde are aggregated and that upon standing, or more readily upon dilution and standing, the larger aggregates will cream out leaving a milky serum portion containing the smaller particles or aggregates. It is further known that the rubber particles or aggregates in the cream portion may be separated from the milky serum and additional water mixed with the cream portion, whereupon creaming again ensues on standing and there again separates a cream portion and a milk serum portion. This is discussed in the article by Beadle and Stevens entitled "An Investigation into the Nature and Properties of Hevea Latex" in the Communications Eighth International Congress of Applied Chemistry, September 4 to 13, 1912, vol. IX, pp. 17 to 40. This process may be repeated until the desired amount of water soluble subtances in the rubber has been removed in the serum separations or washings, and the ash has been reduced to a desired low value, but in such cases, as will be shown below, a large proportion of the protein substances is lost and the nitrogen content of the rubber recovered from the washed cream is below the .37% minimum value of the nitrogen content of the rubber of the present invention.

The present inventors have found that if the pH of formaldehyde treated latex is adjusted to a value either in the range of 2.8 to 4.3 or in the range below 1.2, the resulting discrete aggregates can readily be washed to produce a rubber having a natural ash content as low as .12%, which represents mineral substances found in the latex as tapped, and at the same time having a nitrogen content of at least .37% and generally not exceeding .50%. It has further been observed that these pH ranges of 2.8 to 4.3, and below 1.2, constitute the pH bands where the separated serum or wash water is clear, and hence maintaining the pH within these bands gives minimum losses of fine particles or aggregates of rubber in the separated serum and wash water when the creamed aggregates are separated from the serum or wash water as by decantation. The aggregation of the rubber particles is brought about in a shorter time if the latex is mildly stirred after it has been brought to the proper pH band. The pH of the latex may be lowered from the range of 5 to 6, which it possesses after addition of the formaldehyde, to the range of 2.8 to 4.3 or to the range below 1.2, by the addition of any common acid such as hydrochloric, sulphuric, sulphurous, formic, acetic, oxalic acid, or the like. For convenience, it is preferred to lower the pH of the latex to the range 2.8 to 4.3, rather than to use the additional acid necessary to reduce the pH to below 1.2. In the case of some weak acids, indeed, it may be impossible to low the pH to the range below 1.2.

The amount of formaldehyde added to the latex is not important so long as sufficient has been added to keep the latex preserved until the rubber has been recovered from it. The preferred range is between .7 and 1.3%, but amounts as low as .4% or as high as 3% or more may be satisfactory. The latex is preferably allowed to stand for 12 hours or more after addition of the formaldehyde and this will generally be the case when large bulkings take place or when the rubber is recovered from the formaldehyde preserved latex at some distance from the bulking station. If sufficient formaldehyde has been added to adequately preserve the latex, it makes little difference how long the latex stands before the rubber is recovered from it. According to the present invention, the aggregates may be separated from the clear serum after the formaldehyde treated latex has been adjusted to the proper pH, preferably in the range of 2.8 to 4.3, and has thereafter been washed by the addition of water in one or more operations with rising and separation of the aggregates after each addition of water.

It is preferable, before adjustment of the pH by addition of acid, to dilute the latex with water in order to facilitate the subsequent separation of the aggregates and maintain as much as possible of the water-soluble ingredients in solution. Hot water may be used with good effect in that the aggregation is brought about more quickly at an elevated temperature. However, too high a temperature, i. e., above 75° C., produces very rapid aggregation and coalescence resulting in formation of large clots and should be avoided until after thorough washing, after which it may be used to coalesce the rubber into a coherent sheet.

If the aggregation is effected at a high enough dilution, say by dilution with about 20 volumes of water per volume of latex, sufficient water-solubles may be removed in the first creaming to give a rubber having only .12% or less ash derived from constituents naturally occurring in the latex, without any further washing of the rubber particles. Usually, however, about two volumes of water are added per volume of latex for the first dilution, this being sufficient so that the proportion of serum separated in the first creaming will be 40–50% of the aqueous phase, and the subsequent purification of the aggregates may be accomplished with only one further washing, by dilution of the separated cream with at least ten volumes of water (referred to the volume of the original latex), followed by a second creaming. Then, upon separation of the aggregates from the liquid, as by filtering, and drying, a rubber is produced having a natural ash of not more than .12% and a nitrogen content of at least .37%. Even if very little serum is removed upon completion of the first creaming, the specified degree of purification of the recovered cream may be accomplished with one further washing by dilution of the cream with up to 20 volumes of water (referred to the volume of the original latex).

In finally recovering the rubber, the cream portion, preferably after decantation, may readily be filtered on cloth, such as square woven cotton fabric, for example one having 88 warp and 86 weft threads per inch, or on a wire cloth, or a perforate septum with perforations of a sufficiently small size to retain the aggregated rubber particles.

The rubber product of the present invention may be distinguished from crude rubbers now on the market by its characteristic content of combined formaldehyde. A simple test for the presence of combined formaldehyde in the rubber is to cut up some of the rubber into fine pieces and place in a distillation flask, add water and distill until a negative test for formaldehyde is shown in the distillate; then replace the water with 10% sulphuric acid and resume the distillation. The formaldehyde freed by the action of the sulfuric acid can be detected in the distillate by any one of the usual tests for formaldehyde; for example, add a few drops of a dilute solution of sodium nitroprusside and a similar amount of phenylhydrazine hydrochloride. The solution is then made slightly alkaline, and if formaldehyde is present a blue color readily appears. A better method is to add phenylhydrazine hydrochloride to the distillate, then potassium ferricyanide, and finally concentrated hydrochloric acid. A wine or violet color results if formaldehyde is present.

Rubbers produced according to the present invention have a relatively low capacity for water absorption, presumably due to the low content of water solubles as shown by the low natural ash, a characteristic which makes the present rubber valuable for various uses. Another characteristic of the new rubber is its lower viscosity (i. e., greater "plasticity") in comparison with present crude rubbers. This, of course gives a rubber with a greater ease of breakdown, a great advantage from a power consumption view-point in commercial practice. As measured on the "Mooney plastometer" of the shearing disc type as described by Mooney in Industrial and Engineering Chemistry, Analytical Edition, vol. 6, p. 147 (1934), the relative viscosity (at 100° C.) of rubber produced according to the present invention ranges from 55 to 70 when first prepared, and this rises to a value not exceeding 75 upon maturing for a period of about three months. It has been found that after a year's storage, the relative viscosity values at 100° C. are still less than 80. On the same plastometer, pale crepe samples have relative viscosities in the vicinity of 95, smoked sheets around 90, and fine washed Para over 110. On the Mooney plastometer, believed to be the most advantageous instrument for measuring the viscosity of crude rubbers, the lower the measured viscosity value, the greater is the "plasticity" or softness of the sample. The low viscosity of the rubber of the present invention is obtained without recourse to oxidation of the rubber in any way, in contrast to prior "softened" rubbers which are produced by methods essentially involving oxidation of the rubber.

The initial viscosity values and the values after various periods of milling are shown for smoked sheets and the rubber of the present invention, in the following table.

| Time (min.) on mill at 200° F. | Relative viscosity (by Mooney plastometer) | | |
|---|---|---|---|
| | Smoked sheet | | Rubber of this invention |
| | (1) | (2) | |
| 0 | 92 | 100 | 67 |
| 3 | 89 | 86 | 61 |
| 6 | 77 | 77 | 59 |
| 9 | 75 | 76 | 58 |
| 12 | 73 | 75 | 57 |
| 15 | 72 | 72 | 57 |

A further advantage of the new rubber of the present invention is the excellent abrasion resistance of wear-resistant compounds, such as tire tread stocks, prepared from this new rubber as compared with the same compounds prepared from smoked sheet as in common practice. As an illustration, conventional tread formulae were prepared using smoked sheet, as in standard practice, and also using the new rubber of the present invention. Stocks of each were cured to the same state of vulcanization as shown by the same T-50 value. The same T-50 value on compounds of the same formulation indicates the same degree of vulcanization or state of cure as discussed in the article by Gibbons, Gerke and Tingey in Industrial and Chemical Engineering Chemistry, Analytical Edition, vol. 5, p. 279 (1933). Abrasion resistance, tensile strength and hardness measurements were made on these conventional tread compounds vulcanized to the same degree and made according to the same formula but with smoked sheet and the rubber of the present invention. It was found that while the tensile strength and hardness measurements were substantially the same for the compounds made with the two types of rubber and vulcanized to the same degree, the abrasion resistance measurements made with the rubber of the present invention gave values equal to or better than the compounds made with smoked sheet depending upon the type of abrasion test used. The results of over 40 measurements on conventional tire tread compounds (rubber 100, carbon black 50, pine tar 2, stearic acid 4.5, zinc oxide 2, sulphur 2.5, accelerator 1, antioxidant 2) showed an average of more than 11% greater abrasion resistance with compounds made with the rubber of the present invention than with compounds made with smoked sheet.

The rubber of this invention contains considerably less free acid removable by hot water extraction than usual crepes or sheets. Comparative results are shown in the following table where equal weights of rubber were extracted for one hour with boiling water and the acidic substance titrated to phenolphthalein endpoint.

| Type of rubber | Milliequivalents of acid per gram rubber |
|---|---|
| Pale crepe | .0024 |
| Smoked sheet | .0080 |
| Rubber of this invention | .0016 |

The following Examples 1 to 6 illustrate the preparation of rubber according to the present invention. The relative viscosities noted in the various examples were measured at 100° C. on a "Mooney plastometer" of the shearing disc type after maturing of the rubber for three months.

*Example 1*

To 291 grams of 36.6 total solids latex at room temperature containing 1% formaldehyde and having a pH of 5.4 was added 600 grams of water at 67° C., over a period of about 10 seconds. The temperature of the diluted latex was 51° C. 1.04 grams of 50% aqueous formic acid were then added, lowering the pH of the latex to 4.0. The mixture was stirred for about 9 minutes whereupon the latex particles visibly coarsened and on standing the rubber particles readily rose to the top leaving a subnatant clear serum portion. 380 cc. of the serum were drawn off and 4500 grams of water at room temperature were added to the cream portion to wash the rubber particles. The addition of this wash water raised the pH to 4.3. The diluted cream was stirred and after stirring the rubber particles rose to the top leaving a clear wash water below of the same pH as the diluted cream. The rubber was filtered on square woven cotton cloth and the mass dried at room temperature for 3 days. There was a 93% yield of rubber having a moisture content of .18%, a nitrogen content of .39%, and an ash of .10%. The original latex had an ash of 1.3%. As in all these examples, the test above given for combined formaldehyde shows the presence of formaldehyde in the rubber. The relative viscosity of the rubber was 73.

Examples 2 to 5 illustrate the use of other acids than formic acid for reducing the pH of the formaldehyde preserved latex to within the proper range.

*Example 2*

To 100 grams of 36.6% total solids latex containing 1% formaldehyde and having a pH of 5.4 was added at room temperature 4 grams of 5% aqueous sulphuric acid and the mixture stirred for about 1½ minutes thereupon causing a thickening of the latex. 200 grams of water at room temperature were then added to the thus treated latex over a period of about 5 seconds to give a pH of 3.6, and the thus diluted latex was allowed to stand. The rubber particles or aggregates separated to the top as a cream leaving a clear serum portion below of the same pH as the diluted latex. 135 grams of the serum were drawn off and 1500 grams of water at room temperature were added to the cream. This raised the pH to 3.9 and the rubber particles again creamed leaving a subnatant clear aqueous layer. The rubber particles were filtered on cotton cloth and the mass dried at room temperature for ten days. There was a 93% yield of rubber having a moisture content of .12%, a nitrogen content of .46%, and an ash of .12%. The original latex had an ash of 1.3%. The relative viscosity of the rubber was 70.

*Example 3*

To 291 grams of the latex of Example 2 at room temperature, was added 8 grams of 10% aqueous oxalic acid and the mixture stirred for about 2 minutes to thicken the latex. 600 grams of water at 70° C. were then added to the thickened latex over a period of 35 seconds. The diluted latex had a temperature of 53° C. and a pH of 3.8. The thus treated latex was stirred for about 7 minutes to coarsen the rubber particles, after which, on standing, the rubber particles readily creamed leaving a clear subnatant serum portion. 375 grams of the serum were drawn off and 4500 grams of water at room temperature added to the remaining cream portion to further wash the rubber particles. The addition of this wash water raised the pH to 4.0. The thus diluted latex was allowed to stand whereupon creaming took place with a clear wash water below the supernatant rubber particles in the cream portion. The rubber particles were filtered on cloth and allowed to dry at room temperature for 4 days. There was a 94% yield of rubber having a moisture content of .19%, a nitrogen content of .39%, an ash of .09%, an acetone extract of 2.5% and a relative viscosity of 67.

Example 4

To 100 grams of the latex of Example 2 was added at room temperature .24 gram of sulphur dioxide in the form of a dilute aqueous solution. The thus treated latex, having a pH of 3.5, was stirred for 4 minutes to thicken the same and 200 grams of water at room temperature were added over a period of 5 seconds. The stirring was stopped and the rubber particles rose to the top leaving a clear serum below. 135 grams of the serum were drawn off and 1500 grams of water at room temperature were added to the cream and the remainder of the serum giving a pH of the mixture of 3.3. A second creaming with a clear wash water took place on standing. The rubber particles were then filtered on cloth and allowed to dry at room temperature for 5 days. There was a 92% yield of a rubber having .1% moisture content, .45% nitrogen content, a .08% ash and a relative viscosity of 64.

Example 5

To 100 grams of the latex of Example 2 at room temperature was added 3 grams of 5% aqueous hydrochloric acid and the mixture stirred for 3 minutes to thicken the same. 200 grams of water at room temperature were added over a period of 5 seconds to give a pH of 3.4. The mixture was allowed to stand whereupon the rubber particles creamed out leaving a clear serum. 135 grams of the serum were drawn off and 1500 grams of water at room temperature were added to the remaining cream portion to wash the rubber particles. The pH of the diluted cream was 3.7. The diluted cream was allowed to stand whereupon the rubber particles rose to the top leaving a clear wash water below. The rubber particles were filtered on cloth and dried at room temperature for 6 days. There was a 93% yield of rubber having a moisture content of .15%, a nitrogen content of .44%, an ash of .11% and a relative viscosity of 72.

In the previous examples the creaming of the latex was made to take place in the pH range of 2.8 to 4.3. In the next example the pH of the latex was reduced with hydrochloric acid as in Example 5, but to a pH in the range below 1.2, where, as in cases where the pH is reduced to within the range 2.8 to 4.2, the rubber recovered from the final cream has been found to have a nitrogen content of at least .37%.

Example 6

In this case, the same latex as in Examples 2 to 5 was used. To 100 grams of the latex at room temperature was added 7.2 grams of 50% aqueous hydrochloric acid and the mixture stirred for 1½ minutes to thicken the same. 200 grams of water at room temperature were then added over a period of 5 seconds. The pH of the formaldehyde treated latex was thus reduced to 0.57. The mixture was allowed to stand whereupon the rubber particles creamed out leaving a clear serum. 135 grams of the serum were drawn off and 1500 grams of water at room temperature were added to the remaining cream portion to wash the rubber particles. The diluted cream was allowed to stand and the aggregated rubber particles rose to the top leaving a clear wash water below. The rubber particles were filtered on cloth and dried at room temperature for 6 days. There was a 94% yield of rubber having a nitrogen content of .39%, an ash of .04% and a relative viscosity of 68.

Example 7

The following is an example of a process for producing the rubber of this invention in a single washing step. To 291 grams of 38.9% total solids latex, having a pH of 5.4 and containing 1% of formaldehyde, was added 600 grams of water at 80° C., over a period of about ten seconds. The temperature of the diluted latex was 65° C. Then 1.04 grams of 50% aqueous formic acid was added, bringing the pH of the latex to about 4.0. The mixture was stirred for about four minutes whereupon the latex particles visibly coarsened and on standing the rubber aggregates readily rose to the top leaving a substantially clear subnatant serum portion. The mixture of aggregates and this clear serum was added directly to 4500 cc. of water at room temperature. The pH of the resultant mix was 4.25. This mass was stirred after which the rubber aggregates rose to the top leaving a clear wash water below. The rubber was filtered on square woven cotton cloth and the mass dried at room temperature for four or five days. There was a 93% yield of rubber having an ash content of .115%, a nitrogen content of .43% and a relatively viscosity of 68. The original latex had an ash of 1.3%.

Example 8

The following is an example in which the rubber of this invention is produced by a cold process. To 291 grams of 38.9% total solids latex containing 1% formaldehyde, and having a pH of 5.4, were added 1.04 grams of 50% aqueous formic acid, followed by 88 grams of cold water to bring the mass to 30% solids. Stirring was continued until the whole was of the consistency of cottage cheese. Further water was then added, with stirring continued at such a rate as to maintain this consistency until all of the water had been introduced. The mix then contained 13% solids. The total stirring time was nine minutes. The mixture was now allowed to stand and the rubber aggregates rose readily leaving a clear serum, having a pH of 4.0. 450 cc. of the serum was removed and 4500 grams of water, at room temperature, added to the aggregates to wash them. The diluted mass was stirred, after which the rubber particles rose to the top leaving a clear wash water below. The rubber was filtered on square woven cotton cloth and the mass dried at room temperature for five or six days. There was a yield of rubber of over 90%, having a nitrogen content of .41%, an ash content of .09%, and a relative viscosity of 74. The original latex had an ash content of 1.3%.

In these Examples 1 to 8, the water used for washing the rubber aggregates was substantially

Example 9

As a further example of the present invention, the following detailed description of a plant run is included:

To 512 kilograms of 38.6% total solids latex containing 1% formaldehyde, and having a pH of approximately 6, was added 1024 kilograms of unfiltered river water at 70° C. The temperature of the thus diluted latex was 56° C. 15.7 kilograms of 8½% aqueous formic acid was then added, lowering the pH of the latex to 3.7. The mixture was then stirred until the latex particles had aggregated, requiring approximately 7 minutes, and on standing the rubber aggregates readily rose to the top leaving a clear serum portion. 615 kilograms of the serum was drawn off and 7670 kilograms of water at room temperature was added to the cream portion to wash the rubber particles. The diluted cream was stirred and after stirring the rubber aggregates rose to the top. The rubber was filtered on cotton cloth and dried at room temperature for four days. 181 kilograms of dry rubber was produced, having a nitrogen content of .45%, an ash of natural origin of .09%, and a relative viscosity of 64. In the plant run described in this example, the unfiltered river water used for washing the rubber aggregates contained colloidal iron-aluminum-silicates in rather large amounts and these were appreciably retained by the rubber aggregates so that the actual ash as determined on the dried rubber sample was .30% based on the rubber. Analysis of the ash showed a content of iron, aluminum and silicon oxides of .21% based on the rubber, and hence allowance was made for these oxides to give the above mentioned ash of natural origin of .09%.

The following illustrates separation of the cream portion at pH's outside the range of 2.8 to 4.3 and the range below 1.2. It will be seen that where the pH of the latex on creaming is outside these ranges, the nitrogen content will be below 37%. Different amounts of hydrochloric acid than those used in Examples 5 and 6 were added to the same latex used in Examples 2 to 6 before dilution and creaming. In all other respects the procedure was the same as in Example 5. In one case where 7 grams of 10% aqueous hydrochloric acid were added to the latex before diluting, the pH of the latex after dilution was 1.35. The yield of rubber was 88%, the nitrogen content was .31%, and the ash, .11%. In another case where 3.5 grams of 10% aqueous hydrochloric acid were added, the pH of the latex was 2.0. The yield of rubber was 86%, the nitrogen content was .31% and the ash .05%. In a third case, 5 grams of 5% aqueous hydrochloric acid were added and the pH of the latex upon dilution was 2.51. In this case, the yield of rubber was 88%, the nitrogen content .32%, and the ash .08%. In a fourth case 1.75 grams of 20% aqueous formic acid were added and the pH of the latex upon dilution was 4.6. In this case the yield was 86%, the nitrogen content .28% and the ash .1%. It will be seen that in all these cases where the pH of the latex at the time of creaming was not within one of the correct pH ranges of between 2.8 and 4.3 or below 1.2, the nitrogen was below .37% when the rubber had been sufficiently washed to produce an ash of .12% or less.

The following illustrates how further departures from the present invention, along channels that are possibly suggested in prior work on formaldehyde preserved latex, for example, as described in the Beadle & Stevens article above referred to, also fail to produce the rubber of the present invention. In one case, the 37% total solids latex containing 1% formaldehyde, as used in Examples 2 to 7, was diluted with water to 5% without addition of an acidic material, and natural creaming was allowed to take place. Upon creaming of the rubber particles the serum was cloudy, and after separation of about one-half the liquid content of the serum, fresh water was added and a second creaming was allowed to take place. The same operation was repeated a third time, whereupon the cream particles were filtered and dried in air. The final rubber product had a nitrogen content of .17% and an ash of natural origin of .13%. It is evident that further creaming could readily reduce the ash content to .12 or below, but in any such case the nitrogen content would be far below .35%. The yield of rubber was low, less than 60%. In another case, samples of the latex of Examples 2 to 7 were diluted with water to 2.5% and 10% concentration and filtered through a so-called "Berkfeld Filter" which prevents anything but soluble constituents from passing through. The latex was diluted in an attempt to lower the ash of the filtered rubber. Upon dilution with water and allowing the latex to stand, the rubber particles creamed, leaving a cloudy serum. On filtering, however, the filtrate was clear, showing that the rubber particles in the serum were filtered out along with the rubber particles in the cream. The rubber prepared by filtering the latex diluted to 10% concentration had a nitrogen content of .37%, and ash of natural origin of .42%. The rubber prepared from the latex diluted to 2.5% showed a nitrogen content of .35% and an ash of natural origin of .51%.

It may be seen from the above examples that various modifications in the details of the procedure of preparing rubber according to the present invention may be made, and those skilled in the art may suggest further modifications without departing from the underlying principles of the invention, and hence it is not desired to limit the invention otherwise than as set forth in the appended claims.

Having thus described our invention, what we claim and desire to protect by Letters Patent is:

1. A method of making crude rubber comprising adding an acidic material to a formaldehyde preserved rubber latex to adjust the pH of the latex to a value no greater than 4.3 and which produces a clear serum on creaming of the rubber aggregates, removing and washing in an aqueous medium the rubber aggregates sufficiently to produce a crude rubber having an ash of natural origin of not more than .12%, and drying the rubber.

2. A method of making crude rubber comprising adding an acidic material to a formaldehyde preserved rubber latex to adjust the pH of the latex to a value within the range 2.8 to 4.3, removing and washing in an aqueous medium the rubber aggregates sufficiently to produce a crude rubber having an ash of natural origin of not more than .12%, and drying the rubber.

3. A method of making crude rubber comprising adding an acidic material to a formaldehyde preserved rubber latex to adjust the pH of the latex to a value below 1.2, removing and washing in an aqueous medium the rubber aggregates sufficiently to produce a crude rubber having an ash of natural origin of not more than .12%, and drying the rubber.

4. A crude rubber having a nitrogen content of .37 to .50% and an ash of not more than .12%, said rubber containing combined formaldehyde, and said rubber being substantially identical with a product formed by the process of claim 1.

5. A crude rubber having a nitrogen content of at least .37% to .50% and an ash of natural origin of not more than .12%, said rubber containing combined formaldehyde and having a relative viscosity measurement at 100° C. on the Mooney plastometer of less than 80, and said rubber being substantially identical with a product formed by the process of claim 1.

JOHN McGAVACK.
CHESTER E. LINSCOTT.